US012687881B2

(12) United States Patent
    Arnould

(10) Patent No.: US 12,687,881 B2
(45) Date of Patent: Jul. 21, 2026

(54) TIMER

(71) Applicant: STMicroelectronics International N.V., Geneva (CH)

(72) Inventor: Patrick Arnould, Voreppe (FR)

(73) Assignee: STMicroelectronics International N.V., Geneva (CH)

( * ) Notice: Subject to any disclaimer, the term of this patent is extended or adjusted under 35 U.S.C. 154(b) by 169 days.

(21) Appl. No.: 18/813,588

(22) Filed: Aug. 23, 2024

(65) Prior Publication Data

US 2025/0085737 A1    Mar. 13, 2025

(30) Foreign Application Priority Data

Sep. 7, 2023    (FR) ...................................... 2309402

(51) Int. Cl.
    *G06F 1/08*        (2006.01)
(52) U.S. Cl.
    CPC ...................................... *G06F 1/08* (2013.01)
(58) Field of Classification Search
    CPC ...................................................... G06F 1/08
    See application file for complete search history.

(56) References Cited

U.S. PATENT DOCUMENTS

| | | | |
|---|---|---|---|
| 6,292,045 B1 * | 9/2001 | Bongiorno | G06F 1/08 |
| | | | 714/E11.003 |
| 2005/0022044 A1 * | 1/2005 | Shimosakoda | G06F 1/04 |
| | | | 713/600 |
| 2013/0042135 A1 * | 2/2013 | Lopez-Aguado | G06F 1/12 |
| | | | 713/400 |
| 2015/0137862 A1 | 5/2015 | Bahl et al. | |
| 2020/0389156 A1 | 12/2020 | Gupta | |
| 2022/0046538 A1 | 2/2022 | Warneke et al. | |

* cited by examiner

*Primary Examiner* — Stefan Stoynov
(74) *Attorney, Agent, or Firm* — Seed Intellectual Property Law Group LLP

(57)        ABSTRACT

Provided is a circuit for managing a first clock signal clocking a timer adapted to being controlled by a processor clocked by a second clock signal. When the processor is off, the first clock signal is equal to a third clock signal having a frequency lower than the frequency of the second clock signal. When the processor is on, the first clock signal is equal to a fourth signal having a rising edge at each rising edge of the second clock signal directly following a rising edge of the third clock signal.

20 Claims, 3 Drawing Sheets

TIMER

BACKGROUND

This application claims the priority benefit of French patent application number FR2309402, filed on Sep. 7, 2023, entitled "Compteur de durée," which is hereby incorporated by reference to the maximum extent allowable by law.

TECHNICAL FIELD

The present disclosure generally concerns electronic devices and circuits. The present disclosure relates to the clocking of devices and circuits by clock signals, more particularly to the clocking of a timer circuit by a clock signal.

DESCRIPTION OF THE RELATED ART

It is current for a complex electronic device to use a plurality of clock signals having different clock frequencies to clock the different circuits forming it. According to an example, a first main clock signal having a first frequency may be used for certain circuits, such as a processor, and a second secondary clock signal having a second frequency may be used for specific circuits, such as a timer circuit. The managing of a plurality of clock signals may require the use of signal reclocking circuits.

It would be desirable to be able to improve, at least partly, certain aspects of the managing of clock signals of an electronic device.

BRIEF SUMMARY

There exists a need for electronic devices using a plurality of clock signals having different clock frequencies to clock the different circuits forming it, and comprising no reclocking circuit.

There exists a need for electronic devices using a plurality of clock signals having different clock frequencies to clock a timer, and comprising no reclocking circuit.

There exists a need for a circuit for managing a clock signal of a circuit of an electronic device.

There exists a need for a circuit for managing a clock signal of a timer of an electronic device.

An embodiment overcomes all or part of the disadvantages of the known management of a plurality of clock signals within a same electronic device.

An embodiment overcomes all or part of the disadvantages of known timers.

An embodiment provides a circuit for managing a clock signal of a timer enabling to avoid the use of reclocking circuits.

An embodiment provides a method of managing a clock signal of a timer enabling to avoid the use of reclocking circuits.

An embodiment provides a timer equipped with such a circuit for managing a clock signal.

An embodiment provides an electronic device comprising a processor and a timer equipped with such a circuit for managing a clock signal.

An embodiment provides a circuit for managing a first clock signal clocking a timer adapted to being controlled by a processor clocked by a second clock signal, wherein:

when said processor is off, said first clock signal is equal to a third clock signal having a frequency lower than the frequency of said second clock signal; and when said processor is on, said first clock signal is equal to fourth signal exhibiting a rising edge at each rising edge of said second clock signal directly following a rising edge of said third clock signal.

Another embodiment provides a method of managing a first clock signal clocking a timer adapted to being controlled by a processor clocked by a second clock signal, implemented by a circuit for managing said first clock signal, wherein:

when said processor is off, said first clock signal is equal to a third clock signal having a frequency lower than the frequency of said second clock signal; and when said processor is on, said first clock signal is equal to a fourth signal exhibiting a rising edge at each rising edge of said second clock signal directly following a rising edge of said third clock signal.

According to an embodiment, the management circuit comprises a first circuit for generating said fourth signal.

According to an embodiment, the management circuit comprises a second circuit for generating a fifth signal exhibiting a rising edge at each rising edge of said second clock signal directly following a falling edge of said third clock signal.

According to an embodiment, the management circuit comprises a circuit for managing the state of said processor.

According to an embodiment, said circuit for managing the state of said processor is adapted to delivering a signal for controlling the state of said processor clocked by said fifth signal.

According to an embodiment, the frequency of said second clock signal is in the range from 60 MHz to 10 GHz.

According to an embodiment, the frequency of said third clock signal is in the range from 1 kHz to 100 kHz.

Another embodiment provides a timer equipped with a previously-described circuit for managing said first clock signal.

According to an embodiment, the timer comprises a core adapted to being clocked by said first clock signal.

According to an embodiment, the timer further comprises registers adapted to being clocked by said second clock signal.

Another embodiment provides an electronic device comprising a previously-described timer.

According to an embodiment, the electronic device further comprises said processor.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Figure 1:
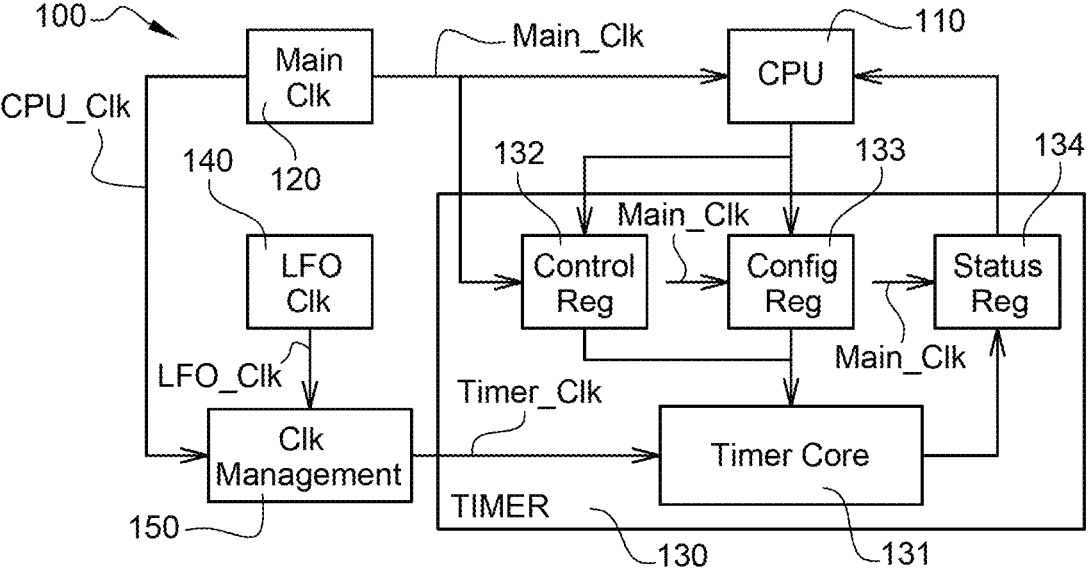
FIG. 1 schematically shows in the form of blocks an electronic device and an embodiment of a clock management circuit.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge," "back," "top," "bottom," "left," "right," etc., or relative positions, such as terms "above," "under," "upper," "lower," etc., or to terms qualifying directions, such as terms "horizontal," "vertical," etc., it is referred, unless specified otherwise, to the orientation of the drawings.

Unless specified otherwise, the expressions "about," "approximately," "substantially," and "in the order of" signify plus or minus 10%, preferably of plus or minus 5%.

The embodiments described hereafter concern the managing of the use of a plurality of clock signals having different clock frequencies within a same electronic device. In particular, these embodiments concern an electronic device comprising a timer having certain circuits clocked by a main clock signal of the device, and having other circuits clocked by dedicated clock signals having clock frequencies lower than the clock frequency of the main clock signal. To have circuits clocked by different clock signals cohabit in a same timer, it is common to use reclocking circuits to adapt the signals exchanged within the timer. These reclocking circuits have different disadvantages, and the embodiments concerned herein endeavor to avoid using reclocking circuits.

Indeed, reclocking circuits, and more generally the reclocking of signals within a same electronic device, may cause the occurrence of delays, such as a delay in the starting of a timer circuit, or a delay during the reading of data supplied by the timer circuit.

For this purpose, the embodiments described in detail hereafter concern a circuit for managing, and a method of managing, a single clock signal supplied to a timer, and having its state depending on the operating state of the device, and in particular on the operating state of a main circuit of the electronic device, such as a processor. When the main circuit of the device is at standby or is stopped, all the circuits of the timer are clocked by the dedicated clock signal. When the main circuit of the device is running, all the circuits of the timer are clocked by an isochronous clock signal, clocked both by the main clock signal and by the dedicated clock signal. The isochronous clock signal is described in detail hereafter.

The advantage of this management circuit and of this clock signal management method is that it enables the timer to avoid the use of reclocking circuits.

FIG. 1 schematically shows in the form of blocks an embodiment of an electronic device 100.

Electronic device 100 is a complex electronic device, adapted to comprising a plurality of electronic circuits.

Electronic device 100 comprises a main circuit 110 (CPU), adapted to controlling the main functions of electronic device 100. According to a preferred embodiment, main circuit 110 (CPU) is a processor of electronic device 100. Thus, hereafter, main circuit 110 is called processor 110. Processor 110 is rated, or clocked, by at least one main clock signal Main_Clk of device 100. According to an example, the frequency of main clock signal Main_Clk is in the range from 60 MHz to 10 GHz.

According to an embodiment, electronic device 100 comprises a plurality of operating modes, and, in particular, at least two operating modes. A full-power operating mode, during which processor 110 is operating (running), and at least one standby mode during which processor 110 is not running, that is, is off or at standby.

Electronic device 100 further comprises a main clock circuit 120 (Main Clk) adapted to generating main clock signal Main_Clk. Main clock circuit 120 delivers main clock signal Main_Clk to processor 110, but also to other circuits described hereafter.

According to an embodiment, electronic device 100 further comprises a timer circuit 130 (TIMER), or timer 130, adapted to being controlled by processor 110. Timer 130 is configured to time durations based on a clock signal, and, for example, to send an alert signal when an expected duration has been counted.

For this purpose, timer 130 comprises a core 131 (Timer Core) implementing the counting functionalities, and one or a plurality of registers enabling timer 130 to exchange data with processor 110, or with any other circuit of device 100 desiring to use functionalities of timer 130.

According to an embodiment, the core 131 of timer 130 exchanges data with the registers, and implements the functionalities of a timer circuit. Core 131 is clocked by a dedicated clock signal Timer_Clk of device 100. The generation of dedicated clock signal Timer_Clk is described hereafter.

According to an embodiment, the registers of timer 130 are rated by a clock signal used by a circuit desiring to implement timer 130. In the case of FIG. 1, the registers are rated by main clock signal Main_Clk which clocks processor 110.

According to an example, timer 130 comprises a first assembly of control registers 132 (Control Reg) adapted to receiving control signals from processor 110, and, for example, from other circuits of device 110 desiring to implement the functionalities of timer 130. According to an example, the control signals received by control registers 132 are start controls signals, stop control signals, reset control signals, etc.

According to an example, timer 130 comprises a second assembly of configuration registers 133 (Config Reg) adapted to receiving configuration data from processor 110, and, for example, from other circuits of device 110 desiring to implement the functionalities of timer 130. According to an example, the configuration data received by configuration registers 133 are data defining the duration to be counted, data defining the counting conditions used by timer 130, etc.

According to an example, timer 130 comprises a third assembly of status registers 134 (Status Reg) adapted to transmitting status data characterizing the state of timer 130. According to an example, the status data transmitted by registers 134 are, for example, data indicating that a certain duration has been counted, or data indicating that timer 130 is counting, etc.

Electronic device 100 further comprises a clock circuit 140 (LFO Clk) dedicated to the clocking of timer 130, and adapted to generating a clock signal LFO_Clk. According to an embodiment, the main clock signal has a clock frequency lower than the clock frequency of main clock signal Main_Clk. According to an example, the main clock signal has a clock frequency much lower than the clock frequency of main clock signal Main_Clk. According to an example, the frequency of clock signal LFO_Clk is in the range from 1 kHz to 100 kHz.

According to an embodiment, electronic device 100 further comprises a circuit 150 for managing (Clk Management) the clock signal Timer_Clk of timer 130. More particularly, management circuit 150 is adapted to delivering clock signal Timer_Clk based on main clock signal Main_Clk, clock signal LFO_Clk, and the operating state of device 100, and more particularly, the operating state of processor 110. A detailed example of the management circuit is described in relation with FIG. 2.

Clock signal Timer_Clk is provided by the following conditions. When processor 110 is off, said clock signal Timer_Clk is equal to clock signal LFO_Clk. When said processor 110 is on, clock signal Timer_Clk is equal to a signal LFO_Clk_Rise exhibiting a rising edge at each rising edge of main clock signal Main_Clk directly following a rising edge of said clock signal LFO_Clk. Signal LFO_Clk_Rise is an isochrone described in further detail in relation with FIGS. 2 to 4.

The advantage of this embodiment is that it enables to avoid the use of a reclocking circuit within timer 130. Indeed, the data received and transmitted by registers 132 to 134 have to be clocked by the clock signal of the circuit sending and/or receiving them, that is, here, processor 110. By clocking the core 131 of timer 130 to signal LFO_Clk_Rise, the data that it receives and transmits are clocked both by main clock signal Main_Clk and by clock signal LFO_Clk, which enables to avoid an additional reclocking circuit.

Figure 2:
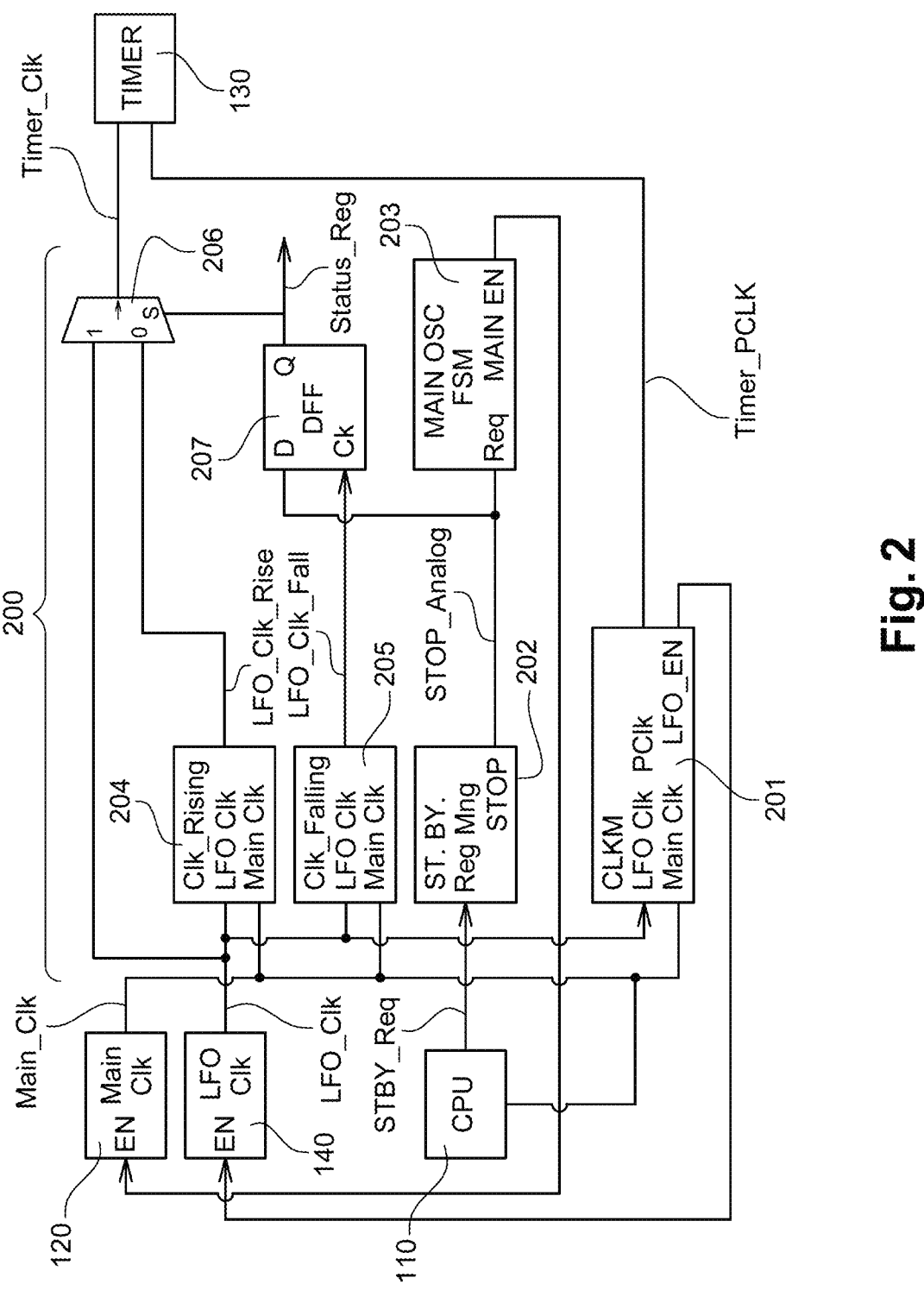
FIG. 2 schematically shows in the form of blocks an embodiment of a clock management circuit.

FIG. 2 schematically shows in the form of blocks a management circuit 200 of the type of the management circuit 150 described in relation with FIG. 1, and its links with processor 110 (CPU), timer 130 (TIMER), and circuits 120 (Main Clk) and 140 (LFO_Clk), all described in relation with FIG. 1.

Management circuit 200 is a practical example of implementation of the previously-described management circuit 150. Other practical implementation modes of management circuit 150 are within the abilities of those skilled in the art.

Management circuit 200 comprises a clock signal management circuit 201 (CLKM). Circuit 201 receives, on a first input terminal LFO_Clk, clock signal LFO_Clk, and, on a second input terminal Main_Clk, main clock signal Main_Clk. Circuit 201 is adapted to delivering, on a first output LFO_EN, a signal for enabling circuit 140 for generating clock signal LFO_Clk. It should be noted that circuit 140 comprises an input enable terminal EN adapted to receiving enable signal LFO_EN. Circuit 201 is further adapted to delivering, on a second output PClk, a clock signal Timer_PClk sent to the timer 130 to save data in the registers of the timer circuit.

The clock signal Timer_PClk is clock is generated from the main clock signal Main_Clk such that the two are fully synchronous. For example, when the clock signal Timer_PClk is enabled, the clock signal Timer_PClk may be the same as the main clock signal Main_Clk. The signal Timer_PClk is enabled by a control register of the clock signal management circuit 201. The control register may be controlled by software. The clock signal Timer_PClk is enabled when the processor 110 (CPU) uses the timer 130 or receives data from or sends data to the timer 130. As described herein, the processor 110 (CPU) may send control data to the control registers 132 (Control Reg) of the timer 130, send configuration data to the configuration registers 133 (Config Reg) and receive status data from the status registers 134 (Status Reg) of the timer 130. However, if the processor 110 (CPU) is not using the timer or receiving data from or sending data to the timer 130, the clock signal Timer_PClk may be disabled. Table 1 shows two operating modes and their respective operating states.

TABLE 1

| Operating modes and operating states | | | |
| --- | --- | --- | --- |
| Mode | Timer_PClk | Main_Clk | Timer |
| Standby operating mode | OFF | OFF | Running on LFO_Clk clock No Register access, CPU not running |
| Full-power operating mode | ON or OFF Controlled by Software in the CLKM | ON | Running on LFO_Clk_Rise clock (LFO_Clk_Rise and Timer_PClk are isochrone, no resynchronization between the two clock domains) |

Management circuit 200 further comprises a circuit 202 for managing the state of processor 110, that is, a circuit configured to receive the information of the operating state of processor 110. Thus, management circuit 202 is adapted to receiving, on an input terminal Req, a signal STBY_Req for requesting a switching to an off or standby state of processor 110. Management circuit 202 is further adapted to delivering, on an output terminal STOP, a signal STOP_Analog for requesting the stopping of the main clock of the device.

Management circuit 200 further comprises a circuit 203 for managing the state of the main clock of the device, that is, a circuit configured to receive a request for turning on or off the main clock, that is, of circuit 120, and to deliver a control signal corresponding to circuit 120. Thus, management circuit 203 is adapted to receiving, on an input terminal Req, request signal STOP_Analog. Management circuit 202 is further adapted to delivering, on an output terminal MAIN_EN, a signal for enabling MAIN_EN circuit 120. It should be noted that circuit 120 comprises an enable input terminal EN adapted to receiving enable signal MAIN_EN.

Figure 3:
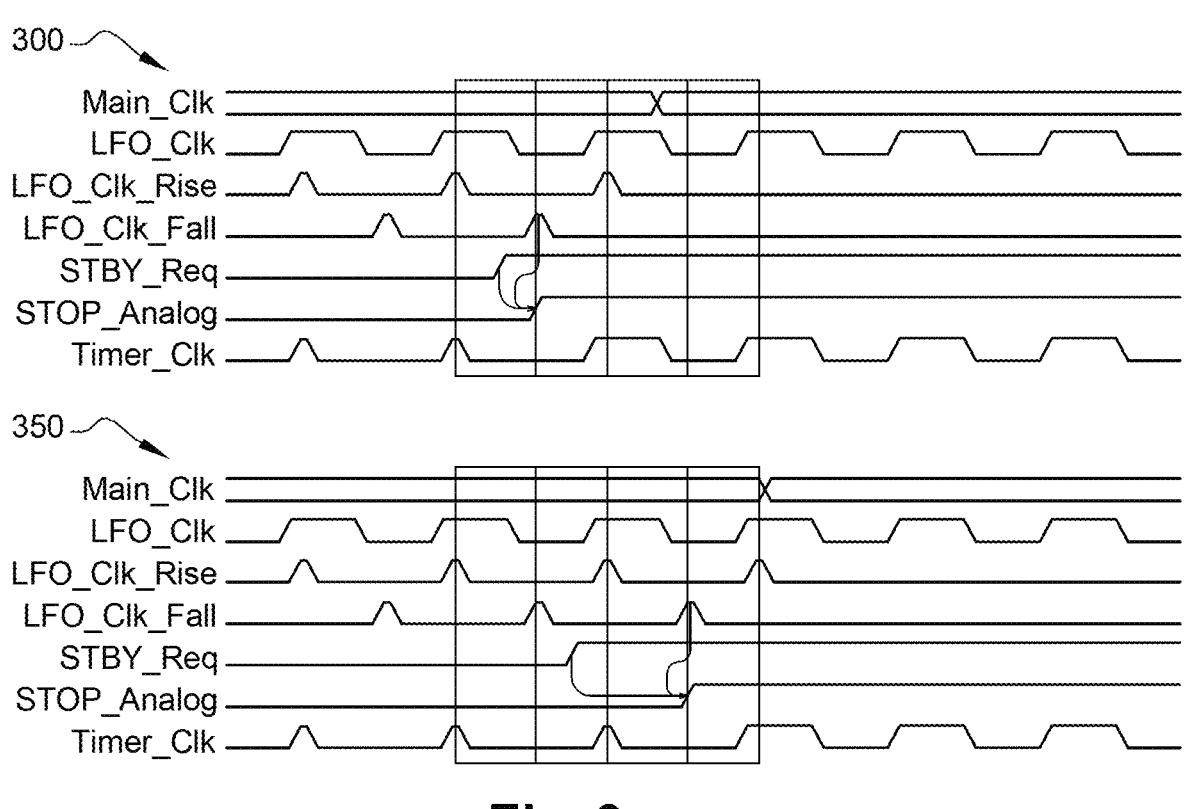
FIG. 3 shows timing diagrams illustrating the operation of the embodiment of FIG. 2.
Figure 4:
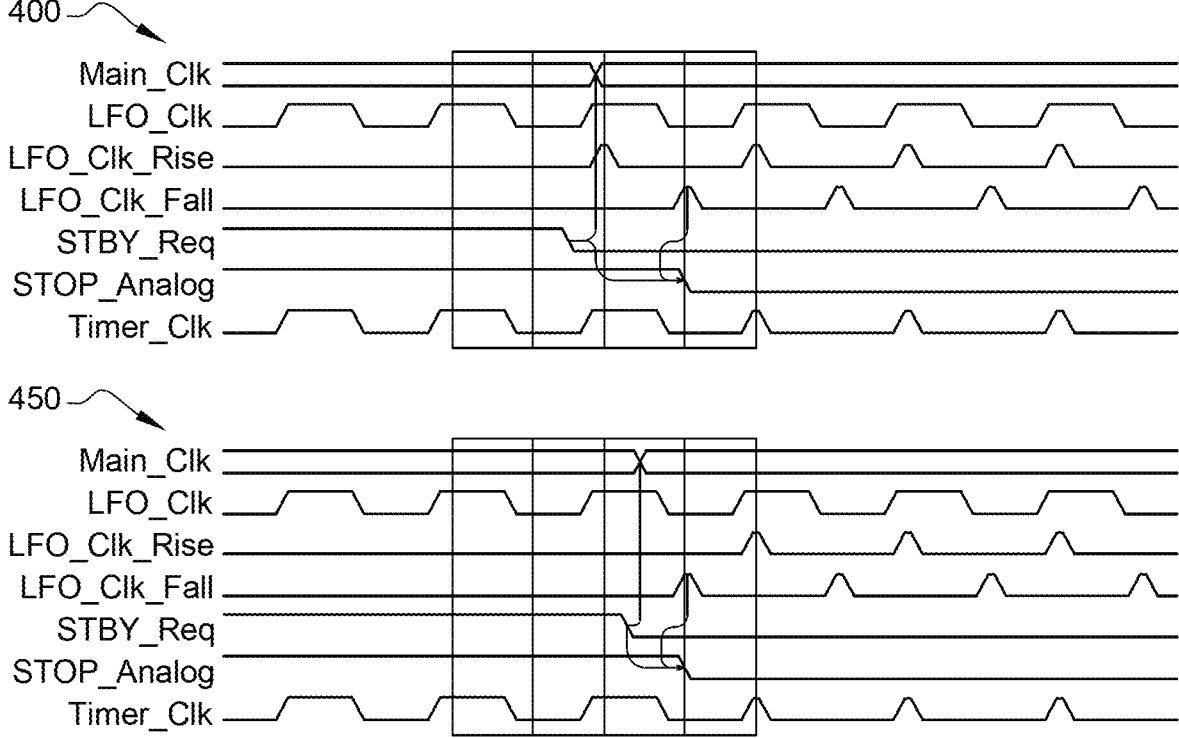
FIG. 4 shows other timing diagrams illustrating the operation of the embodiment of FIG. 2.

Management circuit 200 further comprises a circuit 204 for generating signal LFO_Clk_Rise. As previously described, isochronous signal LFO_Clk_Rise is an isochronous clock signal clocked both by the rising edges of main clock signal Main_Clk and by the rising edges of clock signal LFO_Clk. Thus, generation circuit 204 comprises a first input LFO_Clk adapted to receiving clock signal LFO_Clk, and a second input Main_Clk adapted to receiving main clock signal Main_Clk. Generation circuit 204 is adapted to triggering a rising edge of signal LFO_Clk_Rise at the time when main clock signal Main_Clk exhibits a rising edge directly following a rising edge of clock signal LFO_Clk. In other words, a rising edge of signal LFO_Clk_Rise is triggered by the first rising edge of main clock signal Main_Clk following a rising edge of clock signal LFO_Clk. An illustration of the generation of signal LFO_Clk_Rise is shown in FIGS. 3 and 4.

Management circuit 200 further comprises a circuit 205 for generating a signal LFO_Clk_Fall. Isochronous signal LFO_Clk_Fall is an isochronous clock signal clocked both by the rising edges of main clock signal Main_Clk and by the falling edges of clock signal LFO_Clk. Thus, generation circuit 205 comprises a first input LFO_Clk adapted to receiving clock signal LFO_Clk, and a second input Main_Clk adapted to receiving main clock signal Main_Clk. More particularly, generation circuit 205 is adapted to triggering a rising edge of signal LFO_Clk_Fall at the time when main clock signal Main_Clk exhibits a rising edge directly following a falling edge of clock signal LFO_Clk. In other words, a rising edge of signal LFO_Clk_Fall is triggered by the first rising edge of the main clock signal Main_Clk following a falling edge of clock signal LFO_Clk. An illustration of the generation of signal LFO_Clk_Rise is shown in FIGS. 3 and 4.

Management circuit 200 further comprises a dual-input selector 206, receiving on a first input 1 clock signal LFO_Clk, and on a second input 0 signal LFO_Clk_Rise. Selector 206 outputs the clock signal Timer_Clk of timer 130. Selector 206 is controlled by a signal Status_Reg representing the status of processor 110. Selector 206 thus enables to modify the origin of signal Timer_Clk according to the operating state of processor 110.

Management circuit 200 further comprises a flip-flop 207 (DFF) comprising a clocking terminal CK receiving signal LFO_Clk_Fall, an input terminal D receiving signal STOP_Analog, and an output terminal Q delivering signal Status_Reg.

FIG. 3 comprises two sets of timing diagrams 300 and 350 illustrating the operation of the management circuit 200 described in relation with FIG. 2, when the processor 110 described in relation with FIG. 1 switches from a running state to an off state (OFF).

The sets of timing diagrams 300 and 350 both comprise the following timing diagrams:
  a simplified timing diagram of main clock signal Main_Clk;
  a timing diagram of clock signal LFO_Clk;
  a timing diagram of signal LFO_Clk_Rise;
  a timing diagram of signal LFO_Clk_Fall;
  a timing diagram of request signal STBY_Req;
  a timing diagram of control signal STOP_Analog; and
  a timing diagram of clock signal Timer_Clk.

As previously described, a rising edge of signal LFO_Clk_Rise is triggered by the first rising edge of clock signal Main_Clk following a rising edge of clock signal LFO_Clk. Similarly, a rising edge of signal LFO_Clk_Fall is triggered by the first rising edge of clock signal Main_Clk following a falling edge of clock signal LFO_Clk.

The switching from a running state to an off state of processor 110 is triggered by a request transmitted by signal STBY_Req. Such a request here corresponds to a switching of signal STBY_Req from a low state to a high state. Control signal STOP_Analog transmits the order to the next rising edge of signal LFO_Clk_Fall, and thus triggers the stopping of processor 110 and of circuit 120 and the switching of the original signal of clock signal Timer_Clk.

Sets 300 and 350 illustrate two specific cases of these implementations.

FIG. 4 comprises two sets of timing diagrams 400 and 450 illustrating the operation of the management circuit 200 described in relation with FIG. 2, when the processor 110 described in relation with FIG. 1 switches from an off state (OFF) to a running state.

The sets of timing diagrams 400 and 450 both comprise the following timing diagrams:
  a simplified timing diagram of main clock signal Main_Clk;

a timing diagram of clock signal LFO_Clk;
  a timing diagram of signal LFO_Clk_Rise;
  a timing diagram of signal LFO_Clk_Fall;
  a timing diagram of request signal STBY_Req;
  a timing diagram of control signal STOP_Analog; and
  a timing diagram of clock signal Timer_Clk.

The switching from an off state to a running state of processor 110 is triggered by a request transmitted by signal STBY_Req. Such a request here corresponds to a switching of signal STBY_Req from a high state to a low state. Control signal STOP_Analog transmits the order to the next rising edge of signal LFO_Clk_Fall, and thus triggers the turning on of processor 110 and of circuit 120 and the switching of the original signal of clock signal Timer_Clk.

Sets 400 and 450 illustrate two cases of this implementation.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove.

Circuit (150) for managing a first clock signal (Timer_Clk) clocking a timer (130) adapted to being controlled by a processor (110) clocked by a second clock signal (Main_Clk), may be summarized as including: when said processor (110) is off, said first clock signal (Timer_Clk) is equal to a third clock signal (LFO_Clk) having a frequency lower than the frequency of said second clock signal (Main_Clk); and when said processor (110) is on, said first clock signal (Timer_Clk) is equal to a fourth signal (LFO_Clk_Rise) exhibiting a rising edge at each rising edge of said second clock signal (Main_Clk) directly following a rising edge of said third clock signal (LFO_Clk).

Method of managing a first clock signal (Timer_Clk) clocking a timer (130) adapted to being controlled by a processor (110) clocked by a second clock signal (Main_Clk), implemented by a circuit (150) for managing said first clock signal (Timer_Clk), may be summarized as including: when said processor (110) is off, said first clock signal (Timer_Clk) is equal to a third clock signal (LFO_Clk) having a frequency lower than the frequency of said second clock signal (Main_Clk); and when said processor (110) is on, said first clock signal (Timer_Clk) is equal to a fourth signal (LFO_Clk_Rise) exhibiting a rising edge at each rising edge of said second clock signal (Main_Clk) directly following a rising edge of said third clock signal (LFO_Clk).

The management circuit may include a first circuit for generating (204) said fourth signal (LFO_Clk_Rise).

The management circuit may include a second circuit for generating (205) a fifth signal (LFO_Clk_Fall) exhibiting a rising edge at each rising edge of said second clock signal (Main_Clk) directly following a falling edge of said third clock signal (LFO_Clk).

The management circuit may include a circuit (202) for managing the state of said processor (110).

Said circuit (202) for managing the state of said processor (110) may be adapted to delivering a signal (STOP_Analog) for controlling the state of said processor (110) clocked by said fifth signal.

The frequency of said second clock signal (Main_Clk) may be in the range from 60 MHz to 10 GHz.

The frequency of said third clock signal (LFO_Clk) may be in the range from 1 kHz to 100 kHz.

Timer (130) may be summarized as including being equipped with a circuit (150) for managing said first clock signal (Timer_Clk).

Timer may include a core (131) adapted to being clocked by said first clock signal (Timer_Clk).

Timer may further include registers adapted to being clocked by said second clock signal (Main_Clk).

Electronic device (100) may be summarized as including a timer (130).

Device may further include said processor (110).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:

an output configured to output a first clock signal clocking a timer, the timer being configured to be controlled by a processor clocked by a second clock signal, wherein:

in response to said processor being off, the first clock signal is the same as a third clock signal having a frequency that is lower than a frequency of said second clock signal; and in response to said processor being on, the first clock signal is the same as a fourth signal having a rising edge at each rising edge of the second clock signal directly following a rising edge of said third clock signal.

2. The circuit according to claim 1, comprising:

a first circuit configured to generate said fourth signal.

3. The circuit according to claim 1, comprising:

a second circuit configured to generate a fifth signal having a rising edge at each rising edge of said second clock signal directly following a falling edge of said third clock signal.

4. The circuit according to claim 3, comprising:

a third circuit for managing a state of said processor.

5. The circuit according to claim 4, wherein the third circuit is configured to output a signal for controlling the state of said processor clocked by said fifth signal.

6. The circuit according to claim 1, wherein the frequency of said second clock signal is in a range from 60 MHz to 10 GHz.

7. The circuit according to claim 1, wherein the frequency of said third clock signal is in a range from 1 kHz to 100 kHz.

8. A timer, comprising:

a circuit, including:

an output configured to output a first clock signal clocking a timer, the timer being configured to be controlled by a processor clocked by a second clock signal, wherein:

in response to said processor being off, the first clock signal is the same as a third clock signal having a frequency that is lower than a frequency of said second clock signal; and in response to said processor being on, the first clock signal is the same as a fourth signal having a rising edge at each rising edge of the second clock signal directly following a rising edge of said third clock signal.

9. The timer according to claim 8, comprising:

a core configured to be clocked by said first clock signal.

10. An electronic device, comprising the timer according to claim 9.

11. The electronic device according to claim 10, comprising said processor.

12. The timer according to claim 8, comprising:

registers configured to be clocked by said second clock signal.

13. The timer according to claim 8, comprising:

a first circuit configured to generate said fourth signal.

14. The timer according to claim 8, comprising:

a second circuit configured to generate a fifth signal having a rising edge at each rising edge of said second clock signal directly following a falling edge of said third clock signal.

15. The timer according to claim 14, comprising:

a third circuit for managing a state of said processor.

16. The timer according to claim 15, wherein the third circuit is configured to output a signal for controlling the state of said processor clocked by said fifth signal.

17. The timer according to claim 8, wherein the frequency of said second clock signal is in a range from 60 MHz to 10 GHz.

18. A method, comprising:

outputting, by a circuit, a first clock signal that clocks a timer, the timer being configured to be controlled by a processor clocked by a second clock signal, wherein:

in response to said processor being off, the first clock signal is the same as a third clock signal having a frequency that is lower than a frequency of said second clock signal; and in response to said processor being on, the first clock signal is the same as a fourth signal having a rising edge at each rising edge of the second clock signal directly following a rising edge of said third clock signal.

19. The method according to claim 18, comprising:

generating, by a first circuit, said fourth signal.

20. The method according to claim 18, comprising:

generating, by a second circuit, a fifth signal having a rising edge at each rising edge of said second clock signal directly following a falling edge of said third clock signal.

* * * * *